(12) United States Patent
Syu et al.

(10) Patent No.: US 8,810,531 B2
(45) Date of Patent: Aug. 19, 2014

(54) METHOD OF A TOUCH PANEL DETERMINING MULTI-TOUCH

(75) Inventors: Shen-Sian Syu, Hsin-Chu (TW); Ya-Yun Yu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/086,402

(22) Filed: Apr. 14, 2011

(65) Prior Publication Data

US 2012/0139849 A1 Jun. 7, 2012

(30) Foreign Application Priority Data

Dec. 3, 2010 (TW) ................................ 99142064 A

(51) Int. Cl.
*G06F 3/041* (2006.01)
(52) U.S. Cl.
CPC .... *G06F 3/0416* (2013.01); *G06F 2203/04104* (2013.01)
USPC ........................................................ 345/173
(58) Field of Classification Search
USPC ............. 345/100, 173–178; 178/18.01–20.04
See application file for complete search history.

(56) References Cited

U.S. PATENT DOCUMENTS

| 5,825,352 | A  | * | 10/1998 | Bisset et al. | ................... | 345/173 |
| 2006/0238521 | A1 | * | 10/2006 | Westerman et al. | .......... | 345/173 |
| 2006/0279551 | A1 |   | 12/2006 | Lii | | |
| 2008/0087477 | A1 | * | 4/2008 | Cho et al. | ................... | 178/18.01 |
| 2009/0095540 | A1 | * | 4/2009 | Zachut et al. | .............. | 178/18.03 |
| 2012/0092283 | A1 | * | 4/2012 | Miyazaki | ...................... | 345/173 |

FOREIGN PATENT DOCUMENTS

CN 101833396 A 9/2010
WO 2010137400 A1 12/2010

* cited by examiner

*Primary Examiner* — Quan-Zhen Wang
*Assistant Examiner* — Chad Dicke
(74) *Attorney, Agent, or Firm* — Winston Hsu; Scott Margo

(57) ABSTRACT

In a method of a touch panel determining multi-touch, the touch panel can determine if a sensing channel having a local minimum of a sensing value is the last sensing channel having the sensing value, or determine if sensing channels having the sensing value larger than a threshold generated according to a maximum are successive sensing channels, so as to determine the number of touch points on the touch panel. In addition, the touch panel can find a first local maximum and a second local maximum from the sensing values of the sensing channels, and compare the first local maximum and the second local maximum with a first reference and a second reference, so as to confirm the number of touch points on the touch panel.

16 Claims, 8 Drawing Sheets

| MAX1 | MAX2 | Confirmation Result |
|---|---|---|
| A1 | A1 | 2 Touch Points |
| A1 | A2 | Maintain Original Determination |
| A1 | A3 | 1 Touch Point |
| A2 | A1 | Maintain Original Determination |
| A2 | A2 | Maintain Original Determination |
| A2 | A3 | 1 Touch Point |
| A3 | A1 | 1 Touch Point |
| A3 | A2 | 1 Touch Point |
| A3 | A3 | 1 Touch Point |

METHOD OF A TOUCH PANEL DETERMINING MULTI-TOUCH

BACKGROUND OF THE INVENTION

1. Technical Field

The disclosure is related to methods of determining multi-touch in a touch panel, and particularly to a method of determining and confirming number of touch points utilized in a touch panel.

2. Description of the Prior Art

Touch panels utilize a plurality of sensing channels for detecting touch on a touch panel for generating corresponding sense values. Multi-touch touch panels first determine number of touch points on the touch panel when calculating touch point coordinates. When a touch panel discovers two touch points, sense values on a plurality of sense channels can typically be separated into two distinct waveforms, and the touch point coordinates can be located accurately. When the touch panel determines two touch points on the touch panel, the two touch points must be separated by a sufficient distance, meaning that sense values generated by sense channels between the plurality of sense channels should be zero or near zero, so that the two waveforms formed by the sense values do not merge and cause overlapping. When the two waveforms of the two touch points overlap, the touch panel will only calculate out one touch point, and the touch point coordinates thereof will be inaccurate.

SUMMARY

According to an embodiment, a method of determining multi-touch in a touch panel comprises utilizing a plurality of sense channels to detect touch points on the touch panel for generating corresponding sense values, finding a local minimum of the sense values of the plurality of sense channels according to slope variation of sense values of two neighboring sense channels of the plurality of sense channels, determining when the sense channel having the local minimum is the last sense channel having a sense value, and determining number of touch points on the touch panel according to a result of determining whether the sense channel has the local minimum.

According to an embodiment, a method of determining multi-touch in a touch panel comprises utilizing a plurality of sense channels to detect touch points on the touch panel for generating corresponding sense values, finding a maximum of the sense values of the plurality of sense channels, generating a first threshold according to the maximum, finding sense channels of the plurality of sense channels having sense value greater than the first threshold, and determining when the sense channels having sense value greater than the first threshold are consecutive sense channels for determining number of touch points on the touch panel.

According to an embodiment, a method of determining multi-touch in a touch panel comprises utilizing a plurality of sense channels to detect touch points on the touch panel for generating corresponding sense values, determining number of touch points on the touch panel, finding a first local maximum and a second local maximum from the sense values of the plurality of sense channels, and comparing the first local maximum and the second local maximum with a first reference and a second reference for confirming the number of touch points on the touch panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
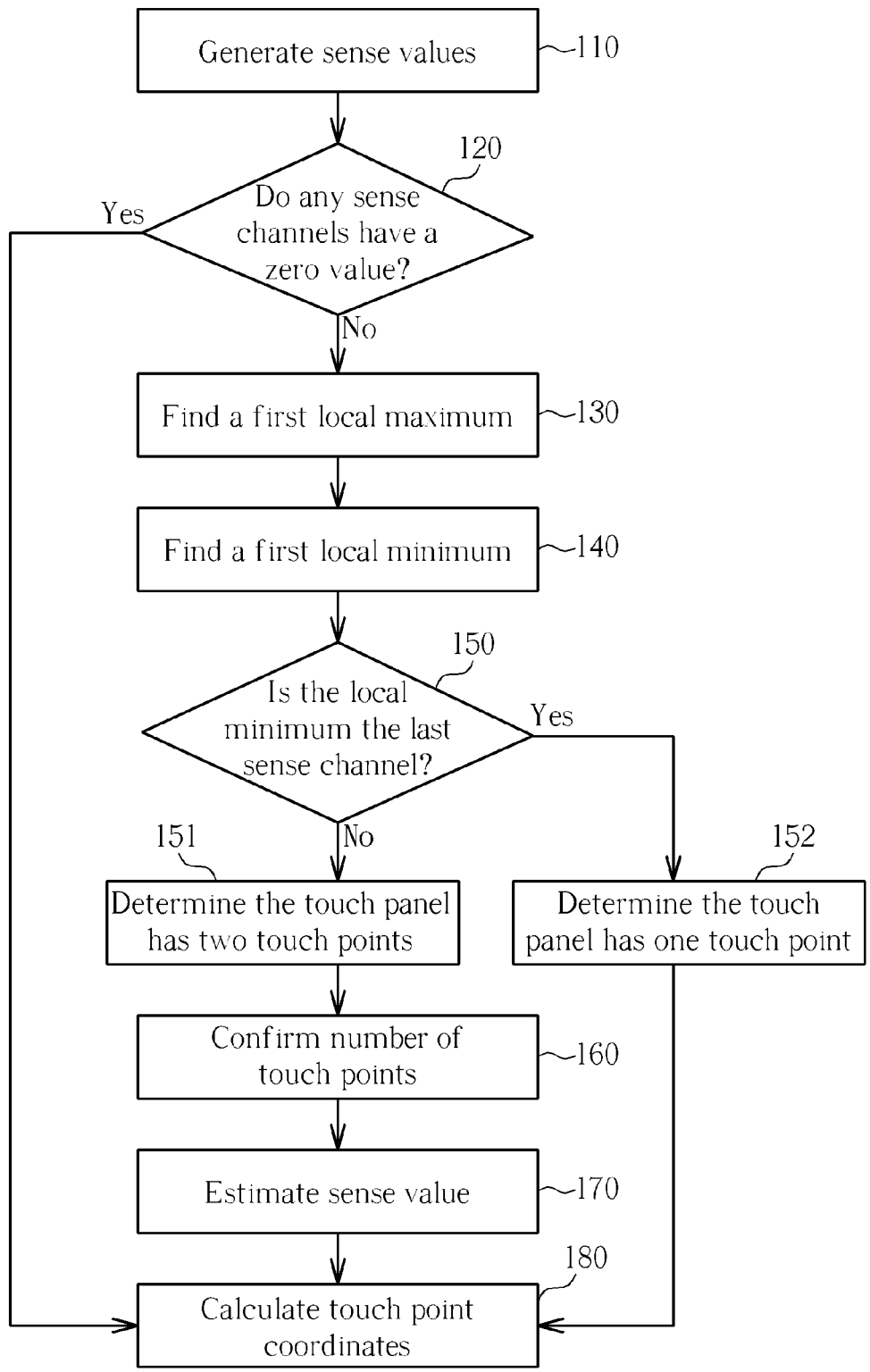
FIG. 1 is a diagram illustrating a method of determining multi-touch in a touch panel according to an embodiment.
Figure 2A:
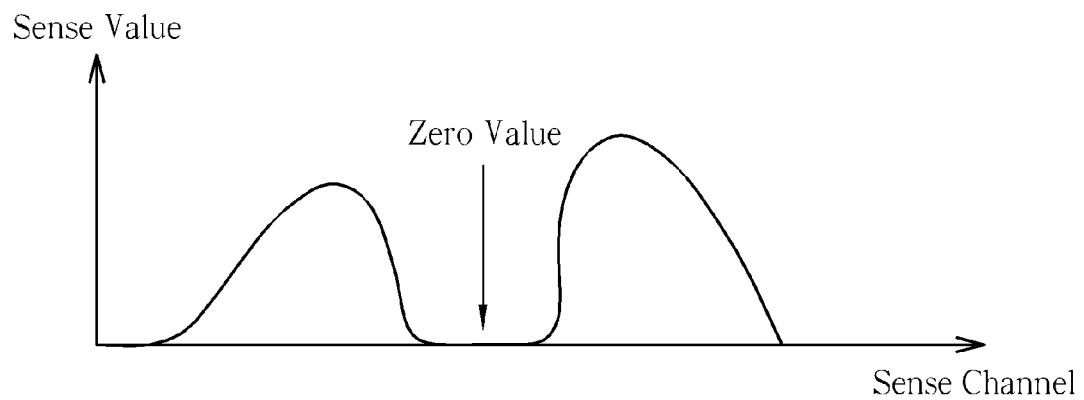
FIG. 2A, FIG. 2B, FIG. 2C, and FIG. 2D are diagrams illustrating signals of a plurality of sense channels.
Figure 2B:
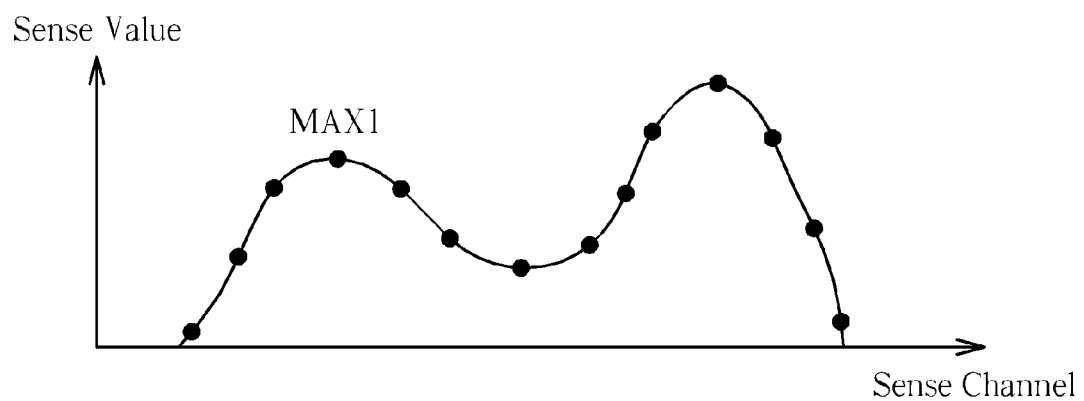
Figure 2C:
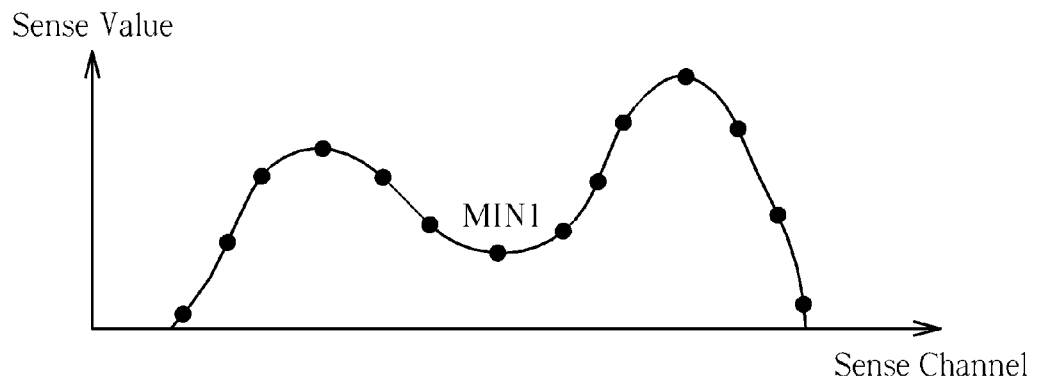
Figure 2D:
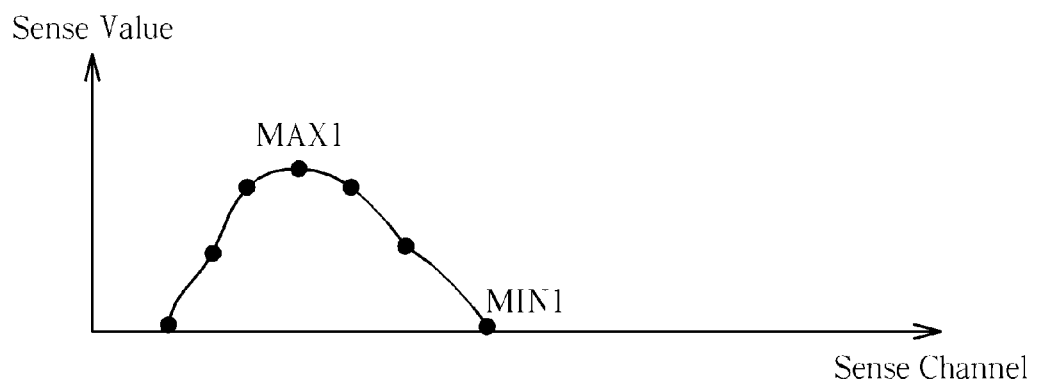

Please refer to FIG. 1, FIG. 2A, FIG. 2B, FIG. 2C, and FIG. 2D. FIG. 1 is a diagram illustrating a method of determining multi-touch in a touch panel according to an embodiment, and FIG. 2A, FIG. 2B, FIG. 2C, and FIG. 2D are diagrams illustrating signals of a plurality of sense channels. The touch panel comprises a plurality of sense channels. In one embodiment, a method of determining multi-touch in the touch panel comprises steps 110 to 180. First, the touch panel utilizes the sense channels to detect touches on the touch panel to generate corresponding sense values (step 110). When a sense value generated by a sense channel of the plurality of sense channels is approximately zero, as shown in FIG. 2A, it is determined that the touch panel has two touch points. When the sense value is less than an approximately zero threshold, the sense value is defined to be approximately zero. If a sense value is not approximately zero, the touch panel may find a first local maximum MAX1 (step 130) and a first local minimum MIN1 (step 140) from the sense values of the plurality of sense channels according to slope variation of sense values of two neighboring sense channels of the sense channel carrying the non-approximately-zero sense value. As shown in FIG. 2B, when the slope variation of the sense values of the sense channel and its previous/following neighboring sense channels changes from a positive value to a negative value, the sense value of the sense channel represents a local maximum. As shown in FIG. 2C, when the slope variation changes from a negative value to a positive value, the sense value of the sense channel represents a local minimum. After finding a first local minimum MIN1, the touch panel determines whether the sense channel having the local minimum is the last sense channel having a sense value (step 150). When the sense channel having the local minimum is not the last sense channel having a sense value, it is determined that the touch panel has two touch points (step 151). When the sense channel having the local minimum is the last sense channel having a sense value, as shown in FIG. 2D, it is determined that the touch panel has one touch point (step 152). Thus, the touch panel can determine the number of touch points on the touch panel according to the result of determining the sense channel having the local minimum.

Figures 3A, 3B:
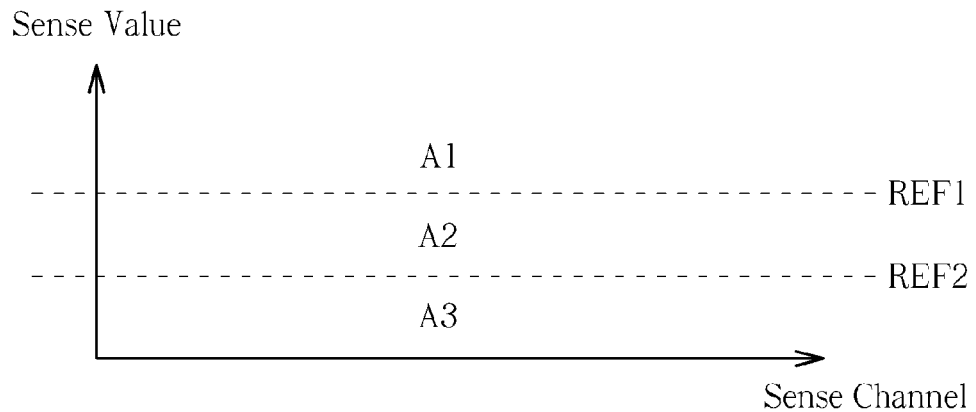
FIG. 3A and FIG. 3B are diagrams illustrating the touch panel confirming the number of touch points according to two reference values.

Please refer to FIG. 1, FIG. 3A, and FIG. 3B. FIG. 3A and FIG. 3B are diagrams illustrating the touch panel confirming the number of touch points according to two reference values. In a first embodiment, step 150 may be utilized to determine the number of touch points on the touch panel, and step 160 can be utilized for the touch panel to further confirm the number of touch points according to the two reference values. In step 130, the touch panel already found the first local maximum MAX1. Utilizing the same method, the touch panel can find a second local maximum MAX2. The first local maximum MAX2 and the second local maximum MAX2 can be compared with a first reference REF1 and a second reference REF2. As shown in FIG. 3A, the first reference REF1 and the second reference REF2 separate sense value amplitude into three regions A1, A2, A3. The touch panel can utilize a lookup table shown in FIG. 3B to confirm the number of touch points on the touch panel according to locations of the first local maximum MAX1 and the second local maximum MAX2 in the three regions. For example, when the first local maximum MAX1 and the second local maximum MAX2 are both greater than the first reference REF1, i.e. the first local maximum MAX1 and the second local maximum MAX2 are both located in region A1, it can be confirmed that the touch panel has two touch points. When the first local maximum MAX1 is between the first reference REF1 and the second reference REF2, and the second local maximum MAX2 is greater than the first reference REF1, i.e. the first local maximum MAX1 is located in region A2 and the second local maximum MAX2 is located in region A1, the number of touch points determined in step 150 is maintained. When the first local maximum MAX1 is less than the second reference REF2, and the second local maximum MAX2 is greater than the first reference REF1, i.e. the first local maximum MAX1 is located in region A3 and the second local maximum MAX2 is located in region A1, it is confirmed that the touch panel has one touch point.

Figure 4A:
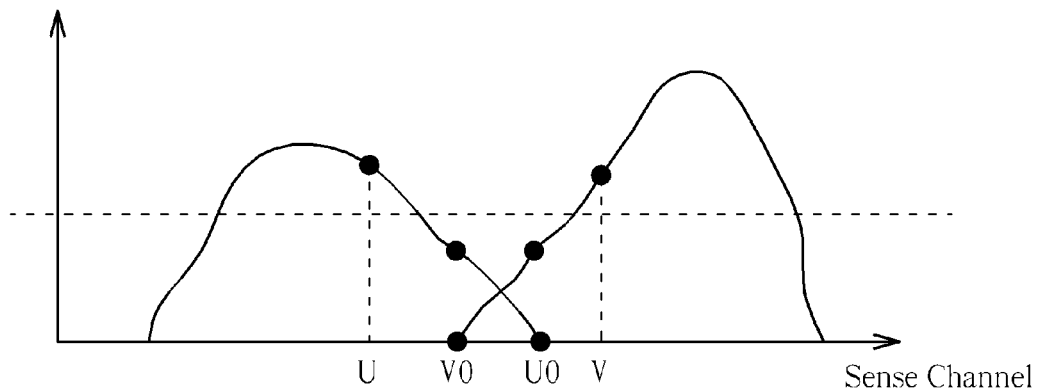
FIG. 4A is a diagram of estimating sense values of two touch points.
Figure 4B:
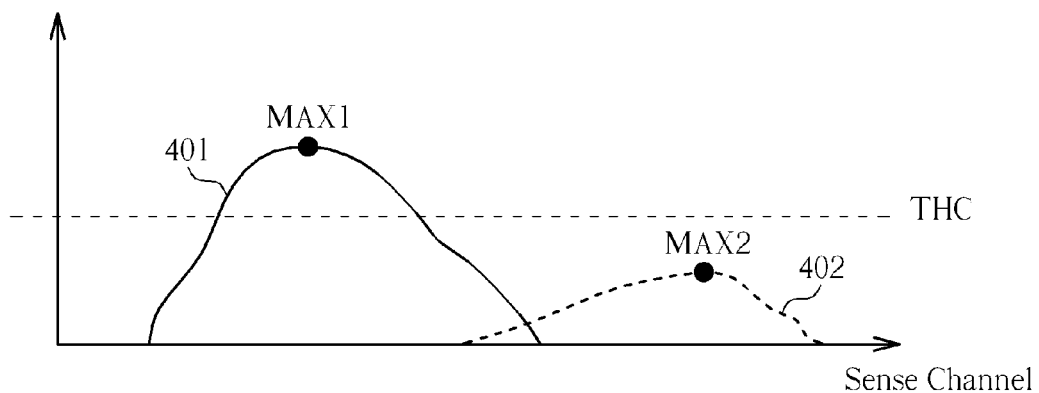
FIG. 4B is a diagram of calculating touch point coordinates of touch points.

Please refer to FIG. 1, FIG. 4A, and FIG. 4B. FIG. 4A is a diagram of estimating sense values of two touch points, and FIG. 4B is a diagram of calculating touch point coordinates of touch points. FIG. 4A shows a general case for sense value waveforms of two touch points. However, when the two touch points are close together, overlapping of the two waveforms occurs, which makes determination of the touch point coordinates of the two touch points difficult. When the touch panel is determined to have two touch points through step 150, and after the two touch points are confirmed in step 160, sense values in the overlapping region of the two waveforms can be estimated in step 170. For example, sense values U0, V0 of two sense channels are estimated according to slope of the sense channel having the local minimum MIN1 and sense values U, V of the previous/following neighbor sense channels. Through the sense value estimated in step 170, the touch panel can more accurately calculate the touch point coordinates of the two touch points separately in step 180. As shown in FIG. 4B, when the touch panel calculates the touch point coordinates of the touch points, in order to confirm that the waveforms of the sense values of the touch points are effective, the maximum of the sense values of the touch points should be greater than a threshold. For example, the maximum MAX1 of the waveform 401 is greater than the threshold THC, so the touch panel performs calculation on the waveform 401 to find the touch point coordinates of the corresponding touch point. The maximum MAX2 of the waveform 402 is less than the threshold THC, so the touch panel does not perform calculation on the waveform 402.

Figure 5:
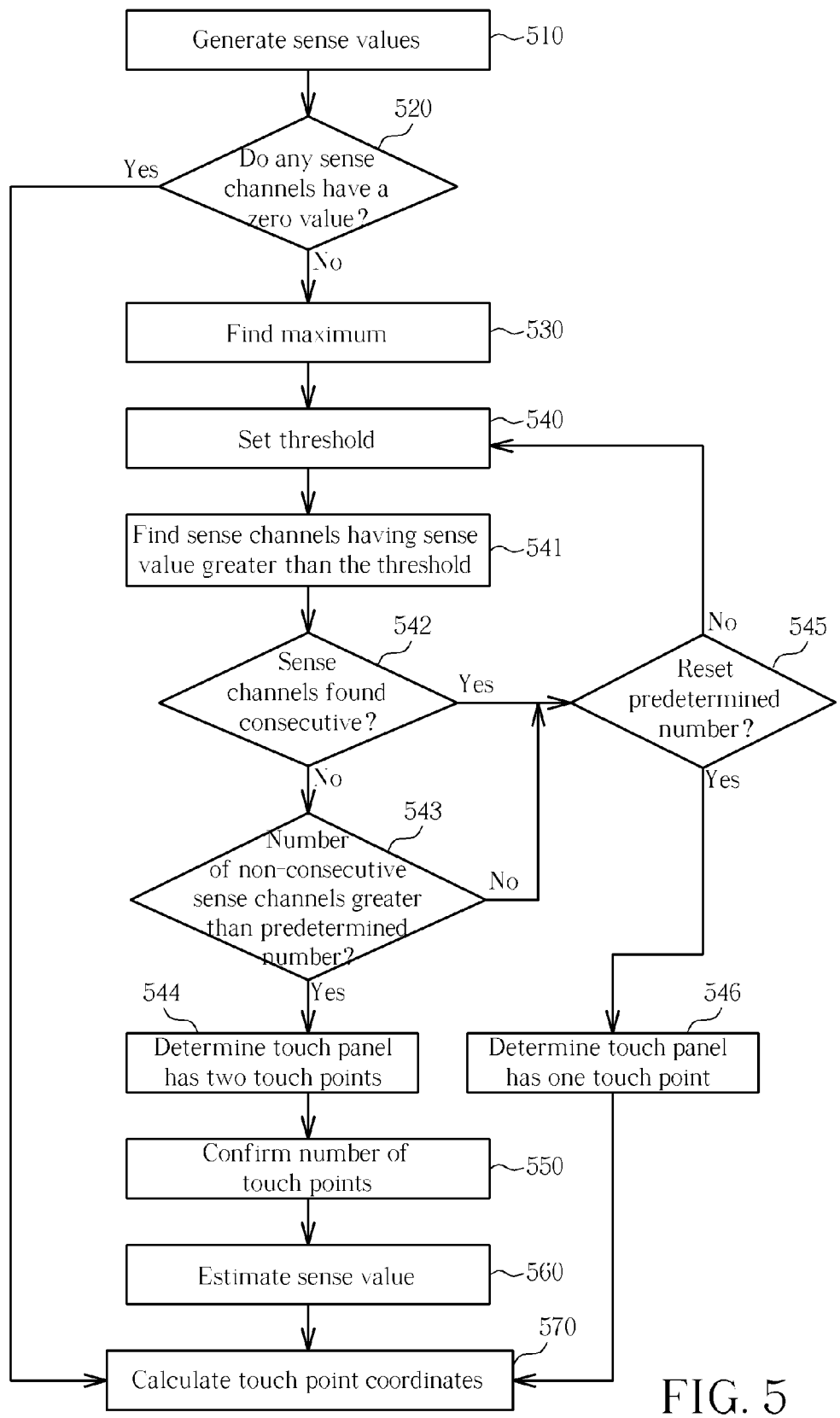
FIG. 5 illustrates a second embodiment of the method of determining multi-touch in a touch panel.
Figure 6A:
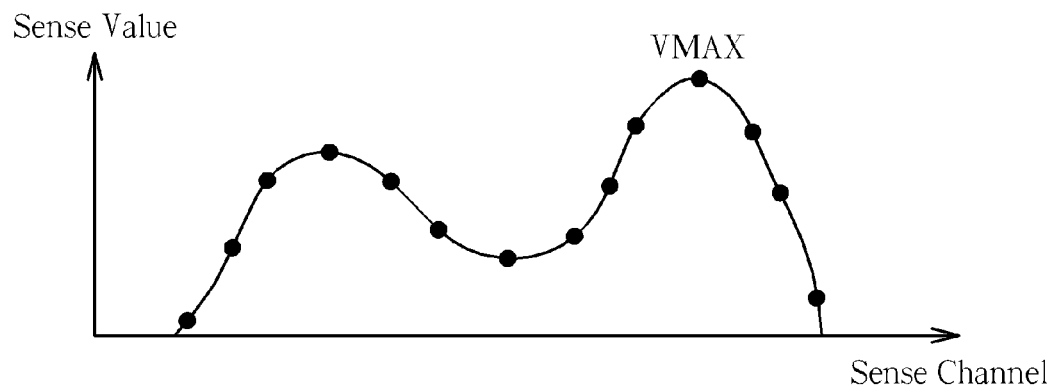
FIG. 6A and FIG. 6B are diagrams of signals of a plurality of sense channels.
Figure 6B:
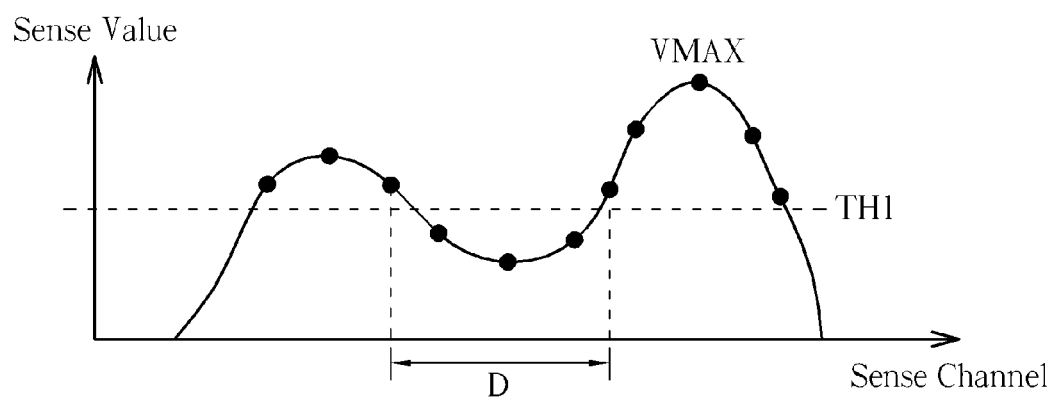

Please refer to FIG. 5, FIG. 6A, and FIG. 6B. FIG. 5 illustrates a second embodiment of the method of determining multi-touch in a touch panel. FIG. 6A and FIG. 6B are diagrams of signals of a plurality of sense channels. The touch panel comprises a plurality of sense channels. In the second embodiment, the touch panel determines multi-touch through steps 510 to 570 comprised by the method shown in FIG. 5. First, the touch panel utilizes the sense channels to detect touches on the touch panel to generate corresponding sense values (step 510). When a sense value generated by a sense channel of the plurality of sense channels is approximately zero, it is determined that the touch panel has two touch points (step 520). If the sense value is not approximately zero, the touch panel may find a maximum VMAX from the sense values of the plurality of sense channels (step 530), as shown in FIG. 6A. A threshold is generated according to the maximum (step 540), e.g. TH=VMAX*R, where TH is the threshold, and R is between 0 and 1. R may be defined by a user. For example, after setting a first threshold TH1, sense channels of the plurality of sense channels having sense value greater than the first threshold TH1 are found (step 541), as shown in FIG. 6B. The touch panel determines if the sense channels having sense value greater than the first threshold TH1 are consecutive sense channels (step 542) for determining the number of touch points on the touch panel. If the sense channels are not consecutive, the touch panel determines whether the sense channels are separated by more than a predetermined number of sense channels (step 543). When the sense channels of the plurality of sense channels having sense value greater than the first threshold TH1 comprise sense channels separated by more than a predetermined number D of sense channels, the touch panel determines that the touch panel has two touch points (step 544). When the sense channels of the plurality of sense channels having sense value greater than the first threshold TH1 are consecutive sense channels, the threshold is reset, e.g. by using a different R value to generate a second threshold TH2, and steps 541 to 543 are repeated. After a predetermined number of iterations (step 545), if the sense channels of the plurality of sense channels having sense value greater than the threshold are still consecutive sense channels, the touch panel determines that the touch panel has one touch point (step 546).

In the second embodiment, in step 550, the touch panel may further confirm the number of touch points based on two reference values, description of which can be referred from the description of FIG. 3A and FIG. 3B above. In step 560, the touch panel may further estimate sense values in the overlapping region of the two waveforms, which is described in the description of FIG. 4A and FIG. 4B. Through the sense values estimated in step 560, the touch panel can more accurately calculate the touch point coordinates of the two touch points separately (step 570).

Figure 7:
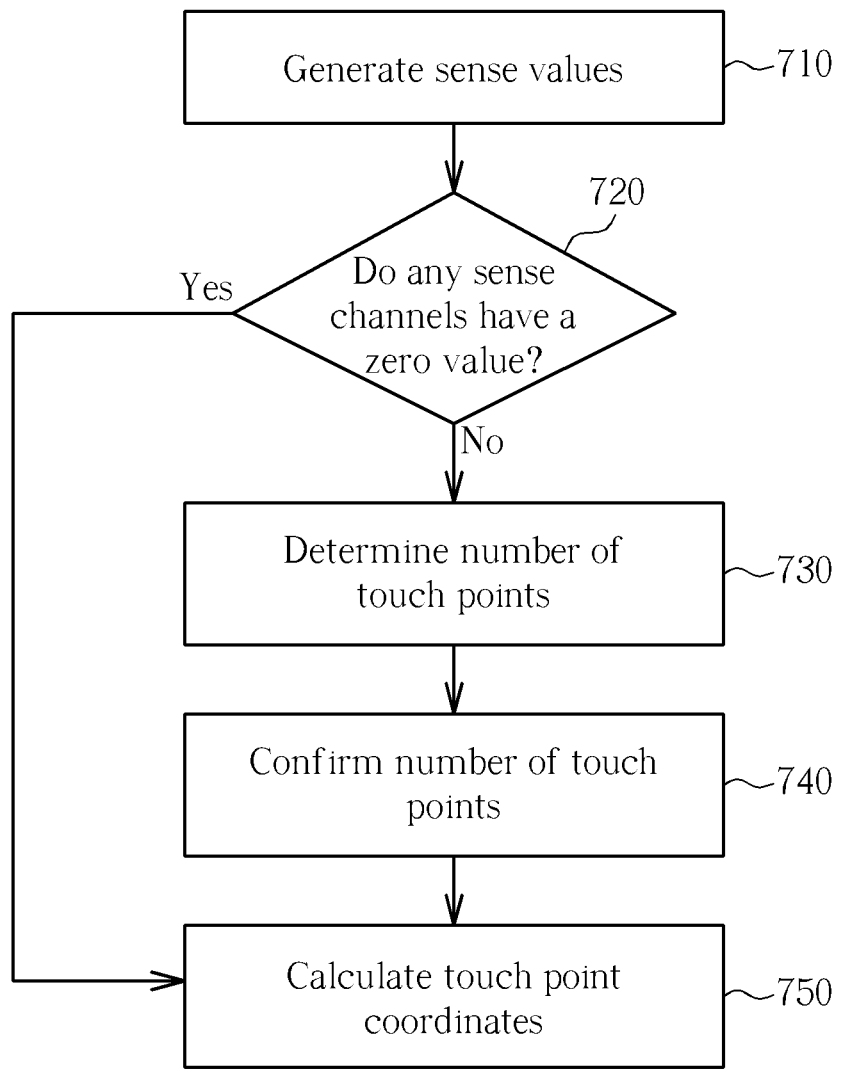
FIG. 7 is a flow chart of a third embodiment of the method of determining multi-touch in a touch panel.

Please refer to FIG. 7. FIG. 7 is a flow chart of a third embodiment of the method of determining multi-touch in a touch panel. The touch panel comprises a plurality of sense channels. In the third embodiment, the touch panel determines the multi-touch through steps 710 to 750 comprised by the method shown in FIG. 7. First, the touch panel utilizes the sense channels to detect touches on the touch panel to generate corresponding sense values (step 710). When a sense value generated by a sense channel of the plurality of sense channels is approximately zero, the touch panel determines that the touch panel has two touch points (step 720). If no sense value is approximately zero, the touch panel may determine the number of touch points according to the description of FIG. 2C and FIG. 2D, or FIG. 6A and FIG. 6B (step 730), then further confirm the number of touch points according to the description of FIG. 3A and FIG. 3B (step 740). The touch panel then calculates the touch point coordinates of the touch points (step 750).

The touch panel of the above embodiments utilizes the plurality of sense channels to detect touches to generate corresponding sense values. The touch panel can determine whether the sense channel having the local minimum is the last sense channel having a sense value, or whether sense channels having sense value greater than the threshold generated according to the maximum are consecutive sense channels, so as to determine the number of touch points on the touch panel. The touch panel may find a first local maximum and a second local maximum from the sense values of the sense channel, and compare the first local maximum and the second local maximum with a first reference and a second reference to confirm the number of touch points on the touch panel. Thus, the embodiments improve accuracy and reliability of multi-touch determination by the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining multi-touch in a touch panel, the method comprising:
   utilizing a plurality of sense channels to detect touch points on the touch panel for generating corresponding sense values;
   determining number of touch points on the touch panel;
   finding a first local maximum and a second local maximum from the sense values of the plurality of sense channels;
   comparing the first local maximum and the second local maximum with a first reference and a second reference for confirming the number of touch points on the touch panel;
   confirming the touch panel has two touch points when the first local maximum and the second local maximum are greater than the first reference;
   maintaining the determined number of touch points when the first local maximum is greater than the first reference, and the second local maximum is between the first reference and the second reference;
   confirming the touch panel has one touch point when the first local maximum is greater than the first reference, and the second local maximum is less than the second reference;
   maintaining the determined number of touch points when the first local maximum is between the first reference and the second reference, and the second local maximum is greater than the first reference;
   maintaining the determined number of touch points when the first local maximum and the second local maximum are between the first reference and the second reference;
   confirming the touch panel has one touch point when the first local maximum is between the first reference and the second reference, and the second local maximum is less than the second reference;
   confirming the touch panel only has one touch point when the first local maximum is less than the second reference, and the second local maximum is greater than the first reference;
   confirming the touch panel has one touch point when the first local maximum is less than the second reference, and the second local maximum is between the first reference and the second reference; and
   confirming the touch panel has one touch point when the first local maximum and the second local maximum are less than the second reference;
   wherein the first reference is greater than the second reference.

2. The method of claim 1, further comprising:
   comparing the first local maximum and the second local maximum with a threshold for calculating touch point coordinates of the touch points on the touch panel according to a comparison result.

3. The method of claim 1, further comprising:
   determining the touch panel has two touch points when a sense value generated by a sense channel between the plurality of sense channels is approximately zero.

4. A method of determining multi-touch in a touch panel, the method comprising:
   utilizing a plurality of sense channels to detect touch points on the touch panel for generating corresponding sense values;
   finding a local minimum of the sense values of the plurality of sense channels;
   finding a first local maximum and a second local maximum from sense values of the plurality of sense channels;
   determining whether the sense channel having the local minimum is the last sense channel having a sense value;
   determining number of touch points on the touch panel according to a result of determining whether the sense channel has the local minimum;
   comparing the first local maximum and the second local maximum with a first reference and a second reference for confirming the number of touch points on the touch panel;
   confirming the touch panel has two touch points when the first local maximum and the second local maximum are greater than the first reference;
   maintaining the determined number of touch points when the first local maximum is greater than the first reference, and the second local maximum is between the first reference and the second reference;
   confirming the touch panel has one touch point when the first local maximum is greater than the first reference, and the second local maximum is less than the second reference;
   maintaining the determined number of touch points when the first local maximum is between the first reference and the second reference, and the second local maximum is greater than the first reference;
   maintaining the determined number of touch points when the first local maximum and the second local maximum are between the first reference and the second reference;
   confirming the touch panel has one touch point when the first local maximum is between the first reference and the second reference, and the second local maximum is less than the second reference;
   confirming the touch panel only has one touch point when the first local maximum is less than the second reference, and the second local maximum is greater than the first reference;
   confirming the touch panel has one touch point when the first local maximum is less than the second reference, and the second local maximum is between the first reference and the second reference; and
   confirming the touch panel has one touch point when the first local maximum and the second local maximum are less than the second reference;
   wherein the first reference is greater than the second reference.

5. The method of claim 4, further comprising:
determining that the touch panel has one touch point thereon when the sense channel having the local minimum is the last sense channel having a sense value.

6. The method of claim 4, further comprising:
determining that the touch panel has two touch points thereon when the sense channel having the local minimum is not the last sense channel having a sense value.

7. The method of claim 4, wherein the step of finding the local minimum of the sense values of the plurality of sense channels comprises:
determining sense value of a sense channel to be a local minimum when a change in slope between sense values of the sense channel and neighboring previous and following sense channels of the sense channel changes from a negative value to a positive value.

8. The method of claim 4, further comprising:
estimating sense values of sense channels on either side of the sense channel having the local minimum according to slope of the sense values of the sense channel having the local minimum and the neighboring previous and following sense channels of the sense channel having the local minimum.

9. The method of claim 4, further comprising:
comparing the first local maximum and the second local maximum with a threshold for calculating touch point coordinates of the touch points on the touch panel according to a comparison result.

10. The method of claim 4, further comprising:
determining the touch panel has two touch points when a sense value generated by a sense channel between the plurality of sense channels is approximately zero.

11. A method of determining multi-touch in a touch panel, the method comprising:
utilizing a plurality of sense channels to detect touch points on the touch panel for generating corresponding sense values;
finding a maximum of the sense values of the plurality of sense channels;
generating a first threshold according to the maximum;
finding sense channels of the plurality of sense channels having sense value greater than the first threshold;
determining whether the sense channels having sense value greater than the first threshold are consecutive sense channels for determining number of touch points on the touch panel;
finding a first local maximum and a second local maximum from the sense values of the plurality of sense channels;
comparing the first local maximum and the second local maximum with a first reference and a second reference for confirming the number of touch points on the touch panel;
generating a second threshold according to the maximum when the sense channels having sense value greater than the first threshold are consecutive sense channels;
finding sense channels of the plurality of sense channels having sense value greater than the second threshold; and
determining whether the sense channels having sense value greater than the second threshold are consecutive sense channels for determining number of touch points on the touch panel.

12. The method of claim 11, further comprising:
determining the touch panel has two touch points when separation between the sense channels having sense value greater than the first threshold is greater than a predetermined number of sense channels.

13. The method of claim 11, further comprising:
determining the touch panel has one touch point when the sense channels having sense value greater than the first threshold are consecutive sense channels.

14. The method of claim 11, further comprising:
confirming the touch panel has two touch points when the first local maximum and the second local maximum are greater than the first reference;
maintaining the determined number of touch points when the first local maximum is greater than the first reference, and the second local maximum is between the first reference and the second reference;
confirming the touch panel has one touch point when the first local maximum is greater than the first reference, and the second local maximum is less than the second reference;
maintaining the determined number of touch points when the first local maximum is between the first reference and the second reference, and the second local maximum is greater than the first reference;
maintaining the determined number of touch points when the first local maximum and the second local maximum are between the first reference and the second reference;
confirming the touch panel has one touch point when the first local maximum is between the first reference and the second reference, and the second local maximum is less than the second reference;
confirming the touch panel only has one touch point when the first local maximum is less than the second reference, and the second local maximum is greater than the first reference;
confirming the touch panel has one touch point when the first local maximum is less than the second reference, and the second local maximum is between the first reference and the second reference; and
confirming the touch panel has one touch point when the first local maximum and the second local maximum are less than the second reference;
wherein the first reference is greater than the second reference.

15. The method of claim 11, further comprising:
comparing the first local maximum and the second local maximum with a threshold for calculating touch point coordinates of the touch points on the touch panel according to a comparison result.

16. The method of claim 11, further comprising:
determining the touch panel has two touch points when a sense value generated by a sense channel between the plurality of sense channels is approximately zero.

* * * * *